United States Patent [19]
Galloway

[11] 3,896,768
[45] July 29, 1975

[54] AUTOMATICALLY FLUSHING ANIMAL CAGE RACK

[76] Inventor: Charles H. Galloway, 2203 Franklin, Bryan, Tex. 77801

[22] Filed: June 5, 1974

[21] Appl. No.: 476,729

[52] U.S. Cl. .................................................. 119/22
[51] Int. Cl. ......................... A01k 1/00; A01k 31/04
[58] Field of Search ................................ 119/22, 28

[56] References Cited
UNITED STATES PATENTS

| | | | |
|---|---|---|---|
| 2,701,547 | 2/1955 | Shaw | 119/22 |
| 3,223,070 | 12/1965 | Gribble et al. | 119/28 X |
| 3,463,123 | 8/1969 | Hoeltge | 119/22 X |

FOREIGN PATENTS OR APPLICATIONS

| | | | |
|---|---|---|---|
| 1,084,516 | 6/1960 | Germany | 119/22 |

Primary Examiner—Hugh R. Chamblee
Attorney, Agent, or Firm—Arnold, White & Durkee

[57] ABSTRACT

An animal cage rack adapted to automatically flush animal waste from shelves beneath animal cages. The flush system operates at a determinable interval, requiring only an external source of water for activation. There is also provided an animal drinking system adapted to deliver a continuous fresh supply of water to each cage.

7 Claims, 8 Drawing Figures

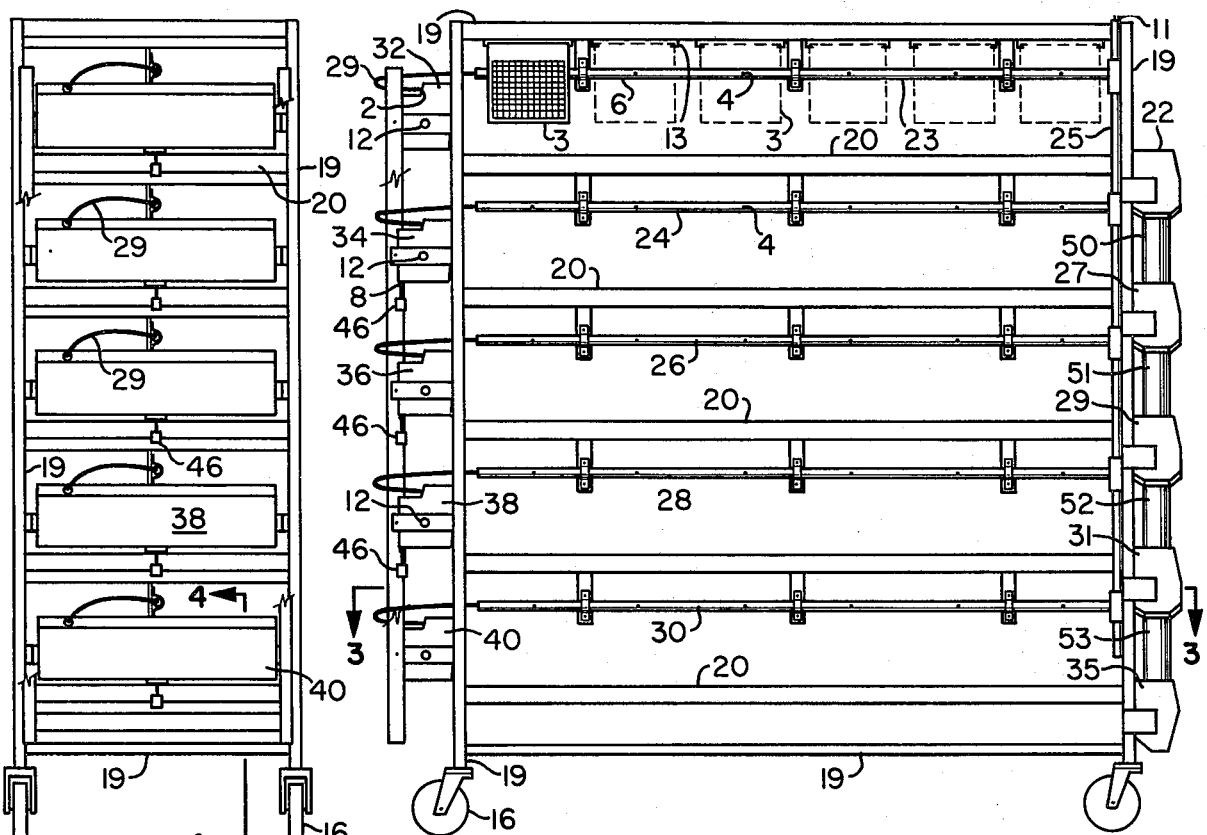
FIG. 2 FIG. 1
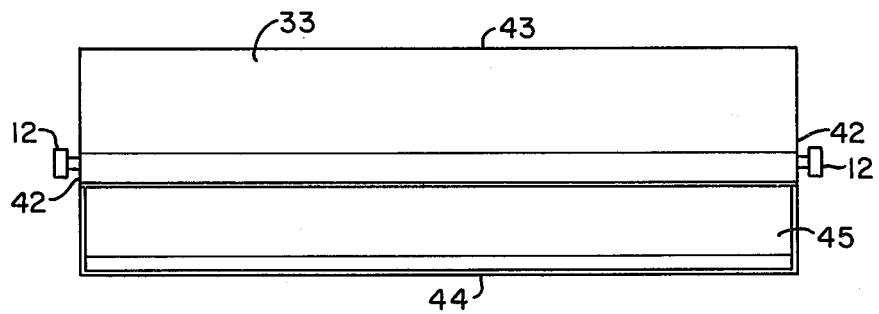
FIG. 6

AUTOMATICALLY FLUSHING ANIMAL CAGE RACK

BACKGROUND OF THE INVENTION

In an animal cage rack for small animals, it is not uncommon for there to be on the order of thirty cages arranged on one cage rack and four or more racks in one room. Thus, there are over one hundred cages, which must be cleaned at frequent intervals to minimize transmission of disease among the animals.

Manually cleaning each cage would be impractical considering the already labor-intensive problems associated with caring for laboratory animals. Thus, an early solution involved constructing the individual cages with wire mesh bottoms placed above a receiving pan or shelf, necessitating only the cleaning of the shelf rather than individual cages. This method still requires some manual handling of the waste, an uneconomic and undesirable solution.

There are available some devices to automatically flush waste from the shelves, and into a sewer system for disposal. Automatically removing waste from the area of animal cages presents a complex problem, usually requiring the use of a large volume of high pressure cleaning fluid, such as water, and perhaps several electrically actuated solenoid valves and timers for periodically releasing or directing the fluid onto the areas to be cleaned.

One such device is illustrated in the U.S. Pat. No. 3,463,123 to Hoeltge. Herein, a system of ramps form a cascade-type flushing system. Among the disadvantages of such a system is the requirement for supplying a large volume of fluid within a short period of time in order that sufficient fluid be available for carrying away the waste. This requirement necessitates a large-quantity water delivery system. Additionally, with the series of successive ramps being cleaned by water from one source, the efficiency of the cleansing action necessarily decreases as the distance from the water source increases.

Another approach to solution of the automatic flushing problem involves the use of a pressurized fluid being directed onto each shelf. This system requires pressure regulators, solenoids and a high volume fluid delivery system, all of which contribute to high cost or inefficiency of operation.

SUMMARY OF THE INVENTION

In order to provide a solution to the problems outlined above, it is one feature of this invention to provide an animal cage rack for receiving a plurality of animal cages, the rack having an automatic flushing apparatus for removal of wastes from the proximity of such cages.

A water supply is located in proximity to receiving pans or shelves beneath the cages. The water supply, serving as a source for animal drinking requirements and waste removal, continuously provides a flow of water to the flushing apparatus. Periodically, at predetermined intervals, the flushing apparatus automatically activates, thereby providing a sufficient volume of water to the waste receiving pans for waste removal.

An additional feature of this invention resides in the low pressure water system. Since there is a continuous flow of water to the flush tank, a low pressure, low volume rate of water delivery adequately suffices to provide sufficient fluid for waste removal, providing the desirable features of simplicity and low cost.

Another feature of this invention is to maintain a continuously fresh water supply to each animal cage.

The other advantages and novel elements of this invention will become apparent to one skilled in the art when considering the drawings in conjunction with the description of the preferred embodiment.

BRIEF DESCRIPTION OF THE DRAWINGS

FIG. 1 is a side view of the cage rack showing the individual cages and the water distribution system.

FIG. 2 is an end view showing the holding tanks associated with the water flood mechanism.

FIG. 6 is a top view of the holding tank.

DESCRIPTION OF THE PREFERRED EMBODIMENT

Figure 3:
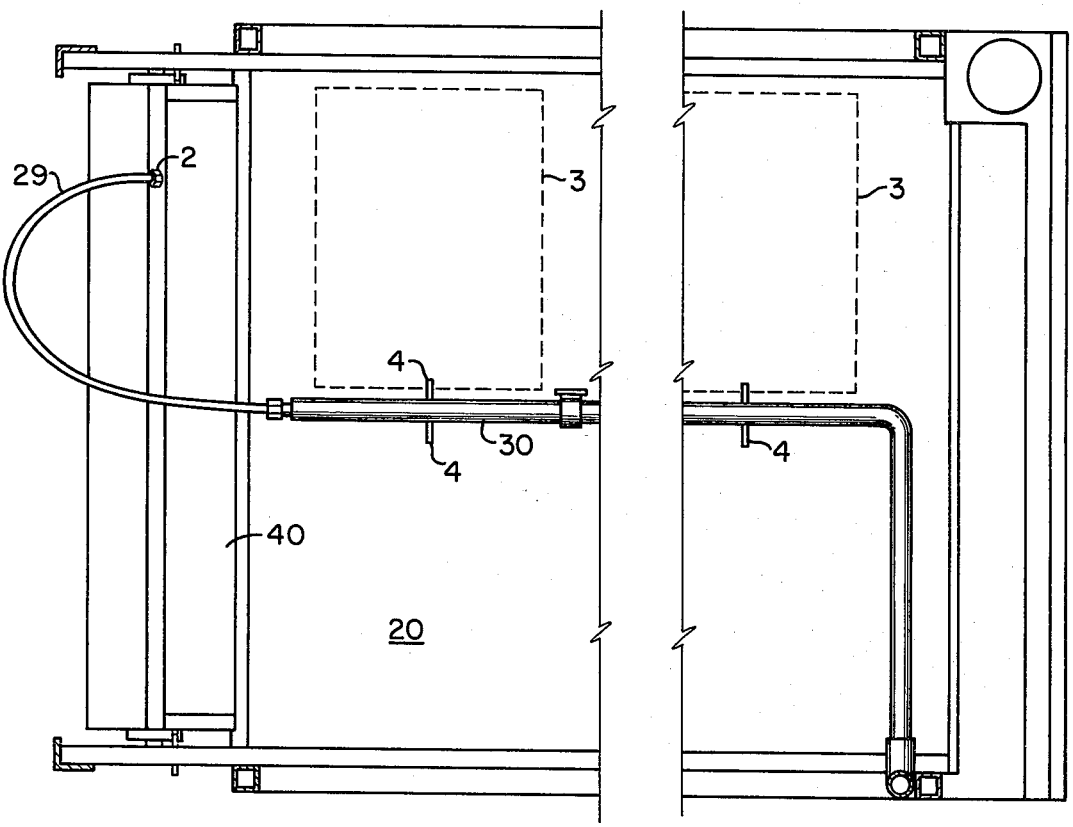
FIG. 3 illustrates a top view of the shelf and holding tank which together with a water supply system comprise the water flood mechanism.

Referring to FIG. 1, there is depicted an animal cage rack with automatic flush mechanism constructed in accordance with the claimed invention. As previously mentioned, cage racks with a large multiplicity of individual cages 3 necessitate frequent cleaning in order to prevent the spread of disease and to maintain generally sanitary conditions. It is highly desirable to accomplish this function with mechanical apparatus as opposed to requiring an animal handler to perform the frequent cleaning function.

The cage rack is of standard configuration, being constructed of a frame 19, with a plurality of supports 13 for receiving the individual cages 3, the rack being mounted on pivoting wheels 16.

The water distribution system constructed in accordance with this invention comprises piping to the individual cages and flush systems and associated valves. It is often desirable to maintain a low pressure in a water system to simplify the valving required and increase the life of the system. One embodiment of this invention utilizes a pressure regulator to deliver water to 4–6 psi to the water distribution system inlet 11. It will also be noted that a fluid other than water could be used in the distribution system. The embodiment described is in terms of a water system but the invention is not intended to be so limited.

The water inlet 11 receives water from an external source for delivery to the piping system. Water then passes through lateral distribution pipes 23, 24, 26, 28, and 30 for ultimate delivery to the flush tanks 32, 34, 36, 38, and 40.

Arranged along the lateral distribution pipes is the animal drinking system. Referring to FIG. 3, a top view of one level of the cage rack, the lateral distribution pipe 30 is shown. Affixed to pipe 30 at spaced apart locations, are animal drinking valves 4 in proximity to each cage 3. Since there is a continuous flow of water to holding tank 40 through orificed valve 2, there will always be a supply of fresh water at each drinking valve 4 irrespective of the time interval between actuation of the drinking valves 4. The drinking valves 4 are of standard configuration, being normally closed and supplying a small quantity of water when actuated by an animal within the cage 3.

At the end of the distribution line 30, there is a flexible hose coupling 29, joining line 30 with holding tank 40 through valve 2. The orificed valve 2 provides a quantity of water sufficient to fill holding tank 40 within a desired time interval, the interval being determined by the requirements for flooding the shelf 20. The time interval may be controlled by sizing the orifice in the valve 2 such that a desired quantity of water will be delivered in the desired time.

There is provided beneath the row of cages 3 (FIG. 1) a drop pan or shelf 20. As animal waste drops through the wire-mesh bottom of cages 3, it necessarily collects on the shelves 20 for disposal. The flush system which floods the shelf 20 with fluid thereby removing the waste, provides for collecting a quantity of a suitable fluid such as water in the flush tanks 32, 34, 36, 38 and 40 then emptying the water onto the respective shelf 20. The shelf 20 is sloped from one end of the rack to the opposite end, as for example in FIG. 1, the shelf 20 is sloped downwardly from the left to the right.

Figure 4:
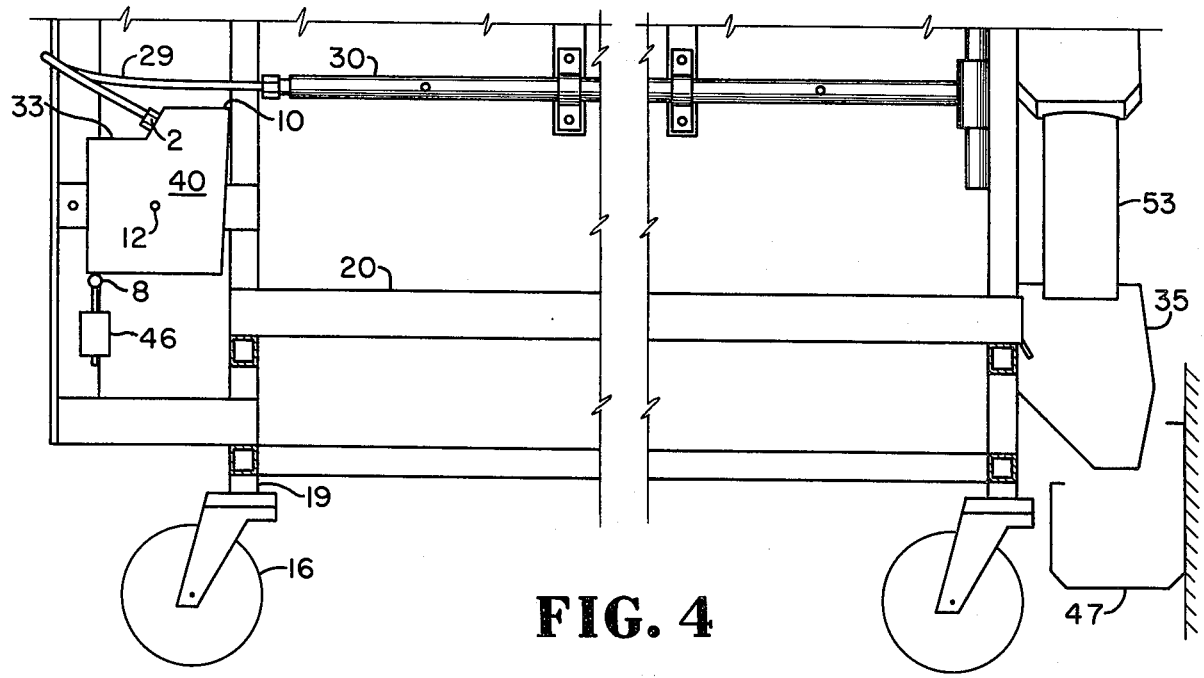
FIG. 4, taken along line 4—4 of FIG. 2, is a sectional view of a portion of the animal cage rack.

Referring to FIG. 4, holding tank 40, constructed the same as tank 32, has side, front, rear, and bottom walls. A top view of tank 40 is shown in FIG. 6, with side walls 42, rear wall 43, and front wall 44. Pivot mount 12, about which tank 40 pivots, is located a small distance from the vertical center of gravity of tank 40. As will be more fully explained hereinafter, this off-center mounting permits the tank 40 to pivot as it fills with water, until the water spills over lip 10 onto shelf 20 (FIG. 4).

Figure 4A:
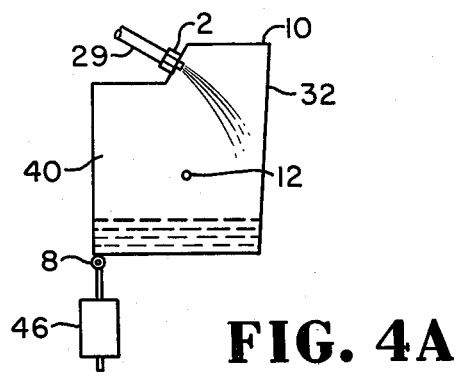
FIGS. 4A, 4B illustrate the operation of the flush mechanism as the holding tank fills with water.

Referring to FIG. 4A, a balance weight 46 is pivotally mounted on tank 40 by pin 8. The weight 46 serves to prevent tank 40 from pivoting about pivot mount 12 prior to being filled with water. Recalling that the tanks 32, 34, 36, 38 and 40 have their pivot mounts 12 displaced a small distance from the vertical center of gravity, filling the tanks with water results in a rotational moment force occurring, thereby tending to cause the tank to rotate toward its heavy side. This rotational movement is initially restrained by balance weight 46 which imparts a rotational moment force to tank 40 counter to that induced by pivot mount 12 being offset from the center of gravity.

Figure 4B:
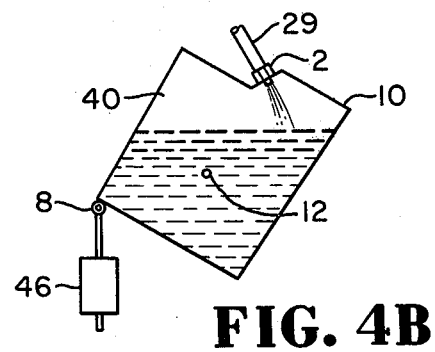

Referring to FIG. 4B, tank 40 remains in the upright position when partially filled, pivoting toward the heavy side as tank 40 fills.

Figure 5:
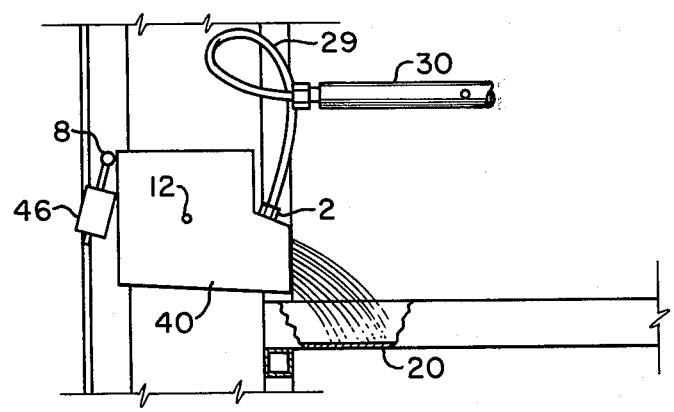
FIG. 5 shows the water holding tank illustrated in FIG. 4, at the point of initiating the water flood cleansing sequence, emptying the fluid onto the shelf beneath the animal cages.

In operation, water or other suitable fluid is delivered to the cage rack at inlet 11 (FIG. 1). The vertical pipe 25 then delivers water to lateral distribution pipes 23, 24, 26, 28 and 30. Orificed valves 2, being normally open, deliver a constant flow of water to the flush tanks 32, 34, 36, 38 and 40. In FIG. 4B, the tank 40 is filled to just below the desired level. The relative moment forces imparted by weight 46 and the off-center mounting of tank 40 are adjusted such that the tank 40 will pivot to an emptying position prior to the point at which water spills over lip 10. As seen in FIG. 5, once the tank 40 reaches an out of balance condition, it pivots to empty the contents of tank 40 onto shelf 20, being maintained in this position until the rotational moment force from weight 46 causes the tank 40 to return to the upright position. Prior to returning upright, all or substantially all of the water will have emptied from tank 40. The majority of the water flowing onto shelf 20 proceeds toward the low end of shelf 20, i.e., to the right in FIG. 5, with a smaller portion being directed to the near end of shelf 20 in order that the entire shelf will be cleaned. Of course, the water after reaching the near end of shelf 20 reverses its flow and proceeds to the low end of shelf 20.

Referring to FIG. 1, as the water flows along shelf 20 toward its low end, the droppings which have collected on shelf 20 are directed toward trough 22. From trough 22, the waste passes through pipes 50–53 and intermediate troughs 27, 29, 31, ultimately being delivered to trough 35 for disposal into a suitable collecting means.

One embodiment of this invention employs a separate trough 47 (FIG. 4) for receiving the waste from the rack. The trough 47 may be mounted along a wall, and be of sufficient length such that several cage racks may be placed in proximity thereto for emptying waste into trough 47 and thence into a common sewer system.

As will be readily obvious to one skilled in the art, there are numerous modifications which could be made to the invention herein described and which would result in no more than an equivalent structure. For example, the counter balance could be made integrally with the holding tank, with compensating adjustments made to the pivot point of the tank. Additionally, the water distribution system could be modified to provide a circulating flow of water past the animal drinking valves in order to maintain the fresh water supply. Such changes are deemed minor and retain the essential elements of the invention.

What I claim is:

1. An animal cage rack with flush system adapted to automatically clean animal waste from the vicinity of animal cages, comprising:
   a plurality of supports for receiving animal cages, the cages constructed to permit waste to pass through the bottom of said cages;
   a shelf situated beneath said cages for receiving animal waste;
   a flush tank with bottom, side, front and back walls, said front wall disposed adjacent one end of said shelf, said tank being pivotally mounted at one end of said cage rack;
   a piping system for delivering a suitable fluid to said tank, said piping system including a water inlet, lateral distribution pipes and an orificed valve for controlling the flow of said fluid to said tank;
   a counterbalance attached to said tank for inhibiting pivotal motion of said tank; and
   drinking valves situated on said lateral distribution pipes adjacent said cages for supplying continuously freshened water to the cages.

2. The apparatus of claim 1 wherein said shelf situated beneath said cages slopes downwardly from one end of said rack to the opposite end.

3. The apparatus of claim 1 including a trough at the lower end of said shelf.

4. An animal cage rack with flush system adapted to automatically clean animal waste from the vicinity of the animal cages, comprising:
   a plurality of supports for receiving animal cages, the cages constructed such that waste passes through the bottom of said cages;

a shelf situated beneath said cages for receiving animal waste, the shelf sloping downwardly from one end of said rack to the opposite end;

a flush tank with bottom, side, front and back walls, said front wall disposed adjacent the upper end of said sloping shelf, said tank being pivotally mounted at one end of said cage rack for emptying a fluid onto said shelf;

piping means including a water inlet pipe, lateral distribution pipes and an orificed valve for controllably delivering a suitable fluid to said tank;

a balance weight attached to the bottom rear portion of said flush tank, said weight balancing said tank thereby inhibiting said tank from pivoting about its pivotal mounting;

a trough at the lower end of said sloping shelf for receiving waste and flushing fluid;

a pipe having one end connected to the lower end of said trough for passing the fluid and waste into a waste disposal system; and drinking valves situated on said lateral distribution pipes adjacent said cages for supplying continuously freshened water to the cages.

5. An animal cage rack with flush system adapted to automatically clean animal waste from the vicinity of animal cages, comprising:

a plurality of supports for receiving animal cages;

a shelf situated beneath said cages for receiving animal waste;

a flush tank with bottom, side, front and rear walls, said front wall disposed adjacent said shelf, said tank being pivotally mounted at one end of said cage rack;

a piping system for delivering a suitable fluid to said flush tank, said piping system including a water input, lateral distribution pipes and an orifice valve for controlling the flow of said fluid to said tank; and drinking valves situated on said lateral distribution pipes adjacent said cages for supplying continuously freshened water to the cages.

6. The apparatus of claim 5, wherein said shelf situated beneath said cages slopes downwardly from one end of said rack to the opposite end.

7. The apparatus of claim 5, including a trough at the lower end of said shelf.

* * * * *